(12) United States Patent
Ikeda et al.

(10) Patent No.: US 6,269,015 B1
(45) Date of Patent: Jul. 31, 2001

(54) POWER SUPPLY APPARATUS FOR ARC-UTILIZING APPARATUSES

(75) Inventors: Tetsuro Ikeda, Osaka; Masayuki Ono, Toyonaka; Takeshi Morimoto, Kobe, all of (JP)

(73) Assignee: Sansha Electric Manufacturing Company, Limited, Osaka (JP)

( * ) Notice: Subject to any disclaimer, the term of this patent is extended or adjusted under 35 U.S.C. 154(b) by 0 days.

(21) Appl. No.: 09/708,226

(22) Filed: Nov. 8, 2000

(51) Int. Cl.[7] .............................. H02M 1/10; B23K 9/10
(52) U.S. Cl. ...................... 363/142; 219/130.21
(58) Field of Search ............... 363/142, 71; 219/130.21, 219/137 PS

(56) References Cited

U.S. PATENT DOCUMENTS

| | | | |
|---|---|---|---|
| 5,272,313 | * 12/1993 | Karino et al. | 219/130.21 |
| 5,310,992 | * 5/1994 | Karino et al. | 219/130.21 |
| 5,319,533 | * 6/1994 | Reynolds et al. | 363/17 |
| 6,054,674 | * 4/2000 | Moriguchi et al. | 219/130.21 |

* cited by examiner

*Primary Examiner*—Shawn Riley
(74) *Attorney, Agent, or Firm*—Duane, Morris & Heckscher LLP

(57) ABSTRACT

An input-side rectifier rectifies a commercial AC voltage from a commercial AC power supply connected to an input terminal and develops a rectified voltage between two output terminals. The rectified voltage is smoothed by a pair of capacitors. A switching arrangement connects the capacitors selectively in series and in parallel between the two output terminals. An inverter is associated with each of the capacitors. A high-frequency voltage from each of the inverters is voltage-transformed by a transformer. The high-frequency voltage from the transformer is converted into a DC voltage by a high-frequency-to DC converter for application to a load. When an AC voltage in a lower voltage group is applied to the input terminal, a switching control unit causes the switching arrangement to connect the capacitors in parallel, and when an AC voltage in a higher voltage group is applied to the input terminal, the switching arrangement is caused to connect the capacitors in series. The inverters include IGBTs having a withstanding voltage of about 800 V.

2 Claims, 2 Drawing Sheets

POWER SUPPLY APPARATUS FOR ARC-UTILIZING APPARATUSES

This invention relates to a power supply apparatus for arc-utilizing apparatuses, e.g. an arc welder, and arc cutter and arc lamp initiating device, and, more particularly, to such power supply apparatus selectively operable from AC voltages of different magnitudes.

BACKGROUND OF THE INVENTION

Power supply apparatuses for arc-utilizing apparatuses may be used with one of higher-voltage providing commercial AC power supplies providing voltages having effective values of the order of, for example, 400 V, e.g. 380 V, 415 V, 440 V and 460 V, or with one of lower-voltage providing commercial AC powers supplies providing voltages having effective values of the order of, for example, 200 V, e.g. 200 V, 208 V and 230 V. In some areas, both higher,. voltage and lower-voltage providing commercial AC power supplies are used. In such areas, it is difficult for a person to determine which power supply apparatus should be brought with him, one operable from a higher commercial AC voltage or one operable from a lower commercial AC voltage. Also, manufacturers have to provide two types of power supply apparatuses, one for a lower AC voltage, one for a higher AC voltage. In addition, sale agents must have both types of power supply apparatuses in stock.

Therefore, a power supply apparatus which can operate from either higher or lower commercial AC voltage has been desired.

An example of such power supply apparatuses is disclosed in U.S. Pat. No. 5,272,313 (Karino et al.) issued on Dec. 21, 1993 and assigned to the assignee of the present application. The apparatus shown in this U.S. patent includes an input-side rectifier which rectifies a voltage from a commercial AC power supply. When the commercial AC power supply coupled to the input-side rectifier is one which supplies one of higher voltages, the output voltage of the rectifier ig smoothed by a series combination of first and second capacitors. If the commercial AC power supply supplies one of lower voltages, the first and second capacitors are connected in parallel with each other, and the output voltage of the rectifier is smoothed by this parallel combination. First and second inverters are connected in parallel with the first and second capacitors, respectively. Each of the first and second inverters converts a DC voltage developed across the associated capacitor into a high-frequency voltage. The high-frequency voltages from the first and second inverters are voltage-transformed by first and second transformers, respectively, and the output voltages of the transformers are combined and converted into a DC voltage by a high-frequency-to-DC converter.

The power supply apparatus of Karino et al. can be used with either higher-voltage providing commercial AC power supplies or lower-voltage providing commercial AC power supplies. The first and second inverters of Karino et al. use IGBTs, each of which has a collector-emitter voltage rating of 600 V. This voltage of 600 V is about two times the maximum value of the input voltage to the first and second inverters. However, some higher-voltage providing commercial AC power supplies may provide a voltage of 575 V, which is higher than 460 V, the highest one of the above-mentioned higher voltages. In this case, the input voltage to the first and second inverters is about 400 V, which means that a margin for increase of the collector-emitter voltage of the IGBTs of the first and second inverters is small, This would cause the power supply apparatus to be damaged when the input voltage undesirably increases. To avoid such damage, IGBTs having a collector-emitter voltage rating of 1200 V may be used, but such IGBTs have a poor switching characteristic and exhibits a large switching loss. Accordingly, a power supply apparatus using such high collector-emitter voltage rating IGBTs exhibits low efficiency.

U.S. Pat. No. 6,054,674 (Moriguchi et at) issued on Apr. 25, 2000 and assigned to the assignee of the present application discloses an improved power supply apparatus. The power supply apparatus of Moriguchi et al., too, employs an input-side rectifier, first and second capacitors and first and second inverters. The power supply apparatus includes also a voltage-lowering converter. When a commercial AC power supply providing a voltage of 575 V is connected to the input-side rectifier, the output voltage of the input-side rectifier is lowered by the voltage-lowering converter, and the lowered voltage is applied across the series combination of the first and second capacitors. When a commercial AC power supply providing a higher voltage other than 575 V is connected to the input-side rectifier, the input-side rectifier output voltage is applied as it is across the series combination of the first and second capacitors. When a lower-voltage providing commercial AC power supply is connected to the input-side rectifier, the first and second capacitors are connected in parallel, and the output voltage of the input-side rectifier is applied across the parallel combination of the first and second capacitors. Thus, a power supply apparatus operable with either higher-voltage providing commercial AC power supplies providing higher voltages including a voltage of 575 V or lower-voltage providing commercial AG power supplies is realized.

However, the power supply apparatus of Moriguchi et al. requires an additional voltage-lowering converter, which increases the cost. In addition, the voltage-lowering converter requires a large-capacitance semiconductor devices which can withstand a voltage of 575 V, which further increases the cost of the power supply apparatus.

An object of the present invention is to provide a power supply apparatus for arc-utilizing apparatuses which operates at a high efficiency and can be manufactured at a low cost.

SUMMARY OF THE INVENTION

According to the present invention, a power supply apparatus for arc-utilizing apparatuses has a plurality of input terminals, to which a commercial AC power supply is connected. The commercial AC power supply is one selected from first and second groups of commercial AC power supplies. The effective value of the highest AC voltage provided by the first group of commercial AC power supplies is 575 V, and the effective value of the highest AG voltage provided by the second group is lower than the effective value of the lowest AC voltage provided by the first group.

An input-side rectifier is connected to the plurality of input terminals, The input-side rectifier has two output terminals and rectifies a commercial AC voltage provided by the commercial AC power supply connected to the input terminals of the apparatus and develops a rectified voltage between the two output terminals.

The rectified voltage developed between the two output terminals of the input-side rectifier is smoothed by a pair of first and second capacitors, which are connected between the output terminals of the input-side rectifier by means of a switching arrangement. The switching arrangement selectively connects the first and second capacitors in series and in parallel with each other between the output terminals.

First and second DC-to-high-frequency converters are connected to the first and second capacitors, respectively. Each of the first and second DC-to-high-frequency converters includes semiconductor switching devices having a conduction path. The conduction paths are alternately rendered conductive and nonconductive, resulting in conversion of the voltages across the associated capacitors into high-frequency voltages.

The high-frequency voltage from each of the first and second DC-to-high-frequency converters is voltage-transformed by a transformer. The voltage-transformed, high-frequency voltages from the transformer are converted into a DC voltage in a high-frequency-to-DC converter. The resulting DC voltage is applied to an arc-utilizing apparatus.

The switching arrangement is controlled by a switching control unit. The switching control unit causes the switching arrangement to connect the first and second capacitors in parallel when one of the commercial AC power supplies in the second group is connected to the input terminals, and causes the switching arrangement to connect the first and second capacitors in series when one of the commercial AC power supplies in the first group is connected to the input terminals.

The conduction paths of the semiconductor switching devices of the first and second DC-to-high-frequency converters have a voltage rating substantially equal to 800 V.

DESCRIPTION OF PREFERRED EMBODIMENT

Figure 1:
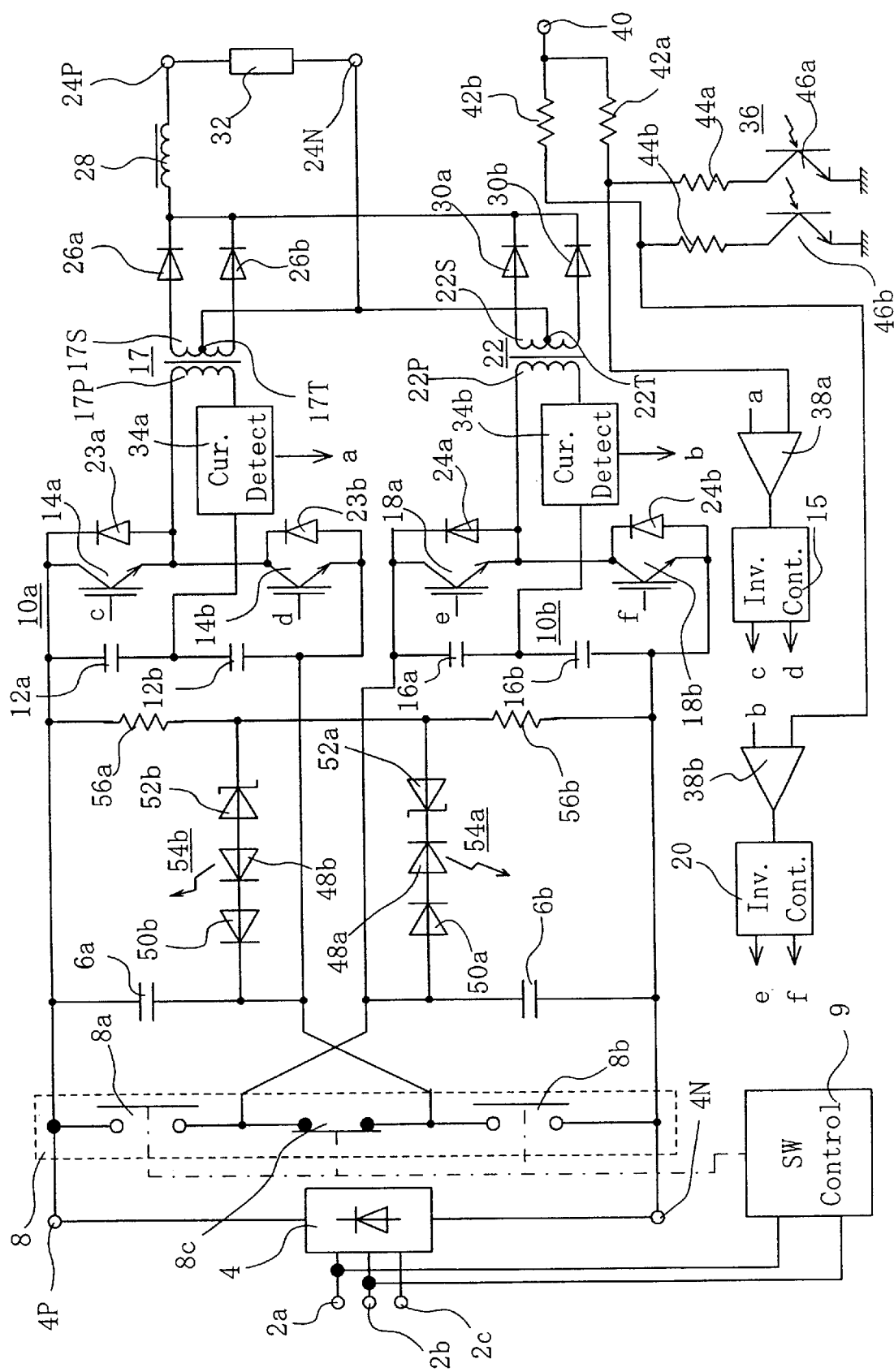
FIG. 1 is a block diagram of a power supply apparatus according to one embodiment of the present invention.

A power supply apparatus for arc-utilizing apparatuses according to the present invention is now described by an example used with, for example, a DC arc welder. The power supply apparatus has input terminals 2a, 2b and 2c, as shown in FIG. 1. A three-phase commercial AC power supply (not shown) is connected to the input terminals 2a, 2b and 2c. The three-phase commercial AC power supply provides one of first and second groups of commercial AC voltages. The first AC voltage group includes relatively higher AC voltages having effective values of 380 V, 400 V, 415 V, 440 V, 460 V and 575 V. The second AC voltage group includes relatively lower AC voltages having effective values of 200 V, 208 V, 230 V and 240 V. The highest voltage of the first, higher voltage group is 575 V, and the highest voltage of the second, lower voltage group is 240 V, which is lower than the lowest voltage of 380 V in the first voltage group.

An input-side rectifier 4 is connected to the input terminals 2a, 2b and 2c. The input-side rectifier 4 has two output terminals, e.g. a positive output terminal 4P and a negative output terminal 4N, and rectifies a commercial AC voltage applied to it via the input terminals 2a, 2b and 2c to thereby develop a rectified voltage between the positive and negative output terminals 4P and 4N.

Smoothing capacitors 6a and 6b are connected between the output terminals 4P and 4N through a switching arrangement 8. The switching arrangement 8 includes two normally open switches 8a and 8b and one normally closed switch 8c.

The normally open switch 8a has its one end connected to the output terminal 4P of the input-side rectifier 4, and has its other end connected to one end of the normally closed switch 8c. The other normally open switch 8b has its one end connected to the other end of the normally closed switch 8c and has its other end connected to the other negative output terminal 4N of the rectifier 4. In other words, the switches 8a, 8c and 8b are connected in series in the named order between the output terminals 4P and 4N, with the switch 8a connected to the terminal 4P.

The capacitor 6a has its one end connected to the terminal 4P and has its other end connected to the junction between the normally closed switch 8c and the normally open switch 8b. The other smoothing capacitor 6b has its one end connected to the output terminal 4N of the input-side rectifier 4 and has its other end connected to the junction between the normally closed switch 8c and the normally open switch 8a.

Accordingly, when the normally open switches 8a and 8b are open with the normally closed switch 8c closed, this state being shown in FIG. 1, the smoothing capacitors 6a and 6b are connected in series between the output terminals 4P and 4N of the input-side rectifier 4. On the other hand, if the normally open switches 8a and 8b are closed and the normally closed switch 8c is opened, the capacitors 6a and 6b are connected in parallel between the terminals 4P and 4N. The rectified voltage from the rectifier 4 is smoothed by the smoothing capacitors 6a and 6b selectively connected in series and in parallel between the output terminals 4P and 4N of the rectifier 4. Opening and closing of the switches 8a, 8b and 8c is achieved by a switching control unit 9 indicated by phantom lines and described in detail later.

A DC-to-high-frequency converter, e.g. an inverter 10a, is connected across the smoothing capacitor 6a. Similarly, a DC-to-high-frequency converter, e.g. an inverter 10b, is connected across the smoothing capacitor 6b.

The inverter 10a includes capacitors 12a and 12b connected in series across the smoothing capacitor 6a, and also a series combination of semiconductor switching devices which is connected across the series combination of the capacitors 12a and 12b. In other words, the inverter 10a is a half-bridge inverter. The semiconductor switching devices may be, for example, IGBTs 14a and 14b having their conduction paths, e.g. emitter-collector conduction paths, connected in series, The control electrodes of the semiconductor switching devices, e.g. the gates of the IGBTs 14a and 14b receive respective control signals c and d from an inverter control unit 15. During the enabling period of each control signal, current flows through the emitter-collector conduction path of the IGBT to which the control signal is applied. The enabling period of the control signal c alternates with the enabling period of the control signal d. The control signals c and d have a frequency of from, for example, several tens of kilohertz to several hundreds of kilohertz.

The junction of the emitter-collector paths of the IGBTs 14a and 14b is connected to one end of a primary winding 17P of a transformer 17. The other, second end of the primary winding 17P is coupled to the junction of the capacitors 12a and 12b. Thus, the DC voltage developed across the smoothing capacitor 6a is converted to a high-frequency voltage having a frequency of from several tens of kilohertz to several hundreds of kilohertz, and the high-frequency voltage is applied across the primary winding 17P of the transformer 17.

Similarly, the inverter 10b includes capacitors 16a and 16b and IGBTs 18a and 18b which are connected in a similar manner to those of the inverter 10a, as shown in FIG. 1. The IGBTs 18a and 18b receive respective control signals a and f from an inverter control unit 20 and controlled in a similar manner to the IGBTs 14a and 14b. The control signals e and f have a frequency of from, for example, several tens of kilohertz to several hundreds of kilohertz, and the enabling periods of the control signals at and t occur alternately. The inverter 10b converts the DC voltage developed across the smoothing capacitor 6b is converted into a high-frequency voltage of from several tens of kilohertz to several hundreds of kilohertz, and the high-frequency voltage is applied to a primary winding 22P of a transformer 22, of which one end is connected to the junction of the emitter-collector paths of the IGBTs 18a and 18b. The other, second end of the primary winding 22P is connected to the junction of the capacitors 16a and 16b.

Flywheel diodes 23a, 23b, 24a and 24b are connected in parallel with the emitter-collector conduction paths of the respective IGBTs 14a, 14b, 18a and 18b.

The IGBTs 14a, 14b, 18a and 18b have a collector-emitter withstanding voltage of about 800 V.

A secondary winding 17S of the transformer 17 is provided with a tap 17T, which is connected to an output terminal 24N of the power supply apparatus, Anodes of rectifying diodes 26a and 26b, which form an output-side rectifier, are connected to the respective ends of the secondary winding 17S, with their cathodes connected together to another output terminal 24P through a smoothing reactor 28.

Similarly, a secondary winding 22S of the transformer 22 has a tap 22T, which is connected to the output terminal 24N. Rectifying diodes 30a and 30b, which form an output-side rectifier, have their anodes connected to the respective ends of the secondary winding 22S and have their cathodes connected together to the output terminal 24P through the smoothing reactor 28.

Thus, the high-frequency voltages induced in the secondary windings 17S and 22S of the transformers 17 and 22 are rectified by the diodes 26a and 26b and 30a and 30b, respectively, and the rectified voltages are smoothed by the smoothing reactor 28 and applied between the output terminals 24P and 24N. A load 32, e.g. a DC arc welder, is connected between the output terminals 24P and 24N.

The diodes 26a, 26b, 30a and 30b and the smoothing reactor 28 form a high-frequency-to-DC converter.

The inverter control units 15 and 20 vary the enabling periods of the control signals c, d, e and f in such a manner that the currents provided by the inverters 10a and 10b are maintained substantially constant. For that purpose, a current detector 34a is disposed in the path interconnecting the junction of the capacitors 12a and 12b and the second end of the primary winding 17P of the transformer 17. The current detector 34a detects the current supplied by the inverter 10a to the transformer 17 and develops a current-representative signal a representing the detected current. An error amplifier 38a detects the difference between the current-representative signal a from the current detector 34a and a reference signal provided by a reference signal generator 36, and the detected difference is applied to the inverter control unit 15. The inverter control unit 15 varies the enabling period of the control signals q and d to be applied respectively to the IGBTs 14a and 14b in such a manner that the difference can be substantially zero. The inverter control unit 15 and the error amplifier 38a form a first converter control unit referred to in the accompanying claim.

Similarly, a current detector 34b is disposed in the path connecting the junction of the capacitors 16a and 16b to the second end of the primary winding 22P of the transformer 22. The current detector 34b detects the current supplied by the inverter 10b to the transformer 22 and develops a current-representative signal b representing the detected current. An error amplifier 38b detects the difference between the current-representative signal b from the current detector 34b and the reference signal provided by the reference signal generator 36, and the detected difference is applied to the inverter control unit 20. The inverter control unit 20 varies the enabling period of the control signals e and f to be applied respectively to the IGBTs 18a and 18b in such a manner that the difference can become substantially zero. The inverter control unit 20 and the error amplifier 38b form a second converter control unit referred to in the accompanying claim.

The reference signal generator 36 includes a reference signal source, e.g. a voltage supply terminal 40, which receives a voltage of a predetermined value as the reference signal. The voltage supply terminal 40 is connected through resistors 42a and 42b of the same resistance value to respective first inputs of the error amplifiers 38a and 38b. Second inputs of the respective error amplifiers 38a and 38b receive the current-representative signals a and b from the current detectors 34a and 34b, respectively.

A series combination of a resistor 44a and a switching device 46a is connected between the first input of the error amplifier 38a and a point of reference potential, e.g. the ground, and a series combination of a resistor 44b and a switching device 46b is connected between the first input of the error amplifier 38b and the ground. Accordingly, when the switching devices 46a and 46b are open, the voltage at the voltage supply terminal 40 is applied to the first inputs of the error amplifiers 38a and 38b. On the other hand, when the switching devices 46a and 46b are closed, the first inputs of the error amplifiers 38a and 38b receive the voltage at the voltage supply terminal 40 voltage-divided respectively by the resistors 42a and 44a and the resistors 42b and 44b. The resistors 44a and 44b have the same resistance value. The resistors 42a and 44a and the switching device 46a form a first reference signal control unit referred to in the accompanying claim, and the resistors 42b and 44b and the switching device 46b form a second reference signal control unit referred to in the accompanying claim.

The switching devices 46a and 46b may be, for example, phototransistors, which form photocouplers with other devices, e.g. light-emitting diodes 48a and 48b, respectively. The photodiodes 46a and 46b are rendered conductive when the associated light-emitting diodes 46a and 46b emit light.

The light-emitting diode 48a forms a series combination 54a with a protection diode 50a and a zener diode 52a. Similarly, the light-emitting diode 40b forms a series combination 54b with a protection diode 50b and a zener diode 52b. One end of the series combination 54a is connected between the junction of resistors 56a and 56b and the junction of the normally open switch 8a and the normally closed switch 8c. The resistors 56a and 56b have the same resistance value and are connected in series between the output terminals 4P and 4N of the input-side rectifier 4, with the resistor 56a connected to the output terminal 4P. The series combination 54b is connected between the junction of the resistors 56a and 56b and the junction of the normally open switch 8b and the normally closed switch 8c.

The protection diode 50a, the light-emitting diode 48a and the zener diode 52a of the series combination 54a are so poled that the light-emitting diode 48a emits light when the normally open switches 8a and 8b are open with the normally closed switch 8c closed, as shown in FIG. 1, and the voltage across the capacitor 6b is larger than the voltage across the resistor 56b by more than the zener voltage of the zener diode 52a.

Similarly, the protection diode 50b, the light-emitting diode 48b and the zener diode 52b of the series combination 54b are so poled that the light-emitting diode 48b emits light when the normally open switches 8a and 8b are open with the normally closed switch 8c closed with the voltage across the capacitor 6b being smaller than the voltage across the resistor 56b by more than the zener voltage of the zener diode 52b.

The light-emitting diode 48a is a first voltage detector referred to in the accompanying claim, while the light-emitting diode 48b is a second voltage detector referred to in the accompanying claim.

Figure 2:
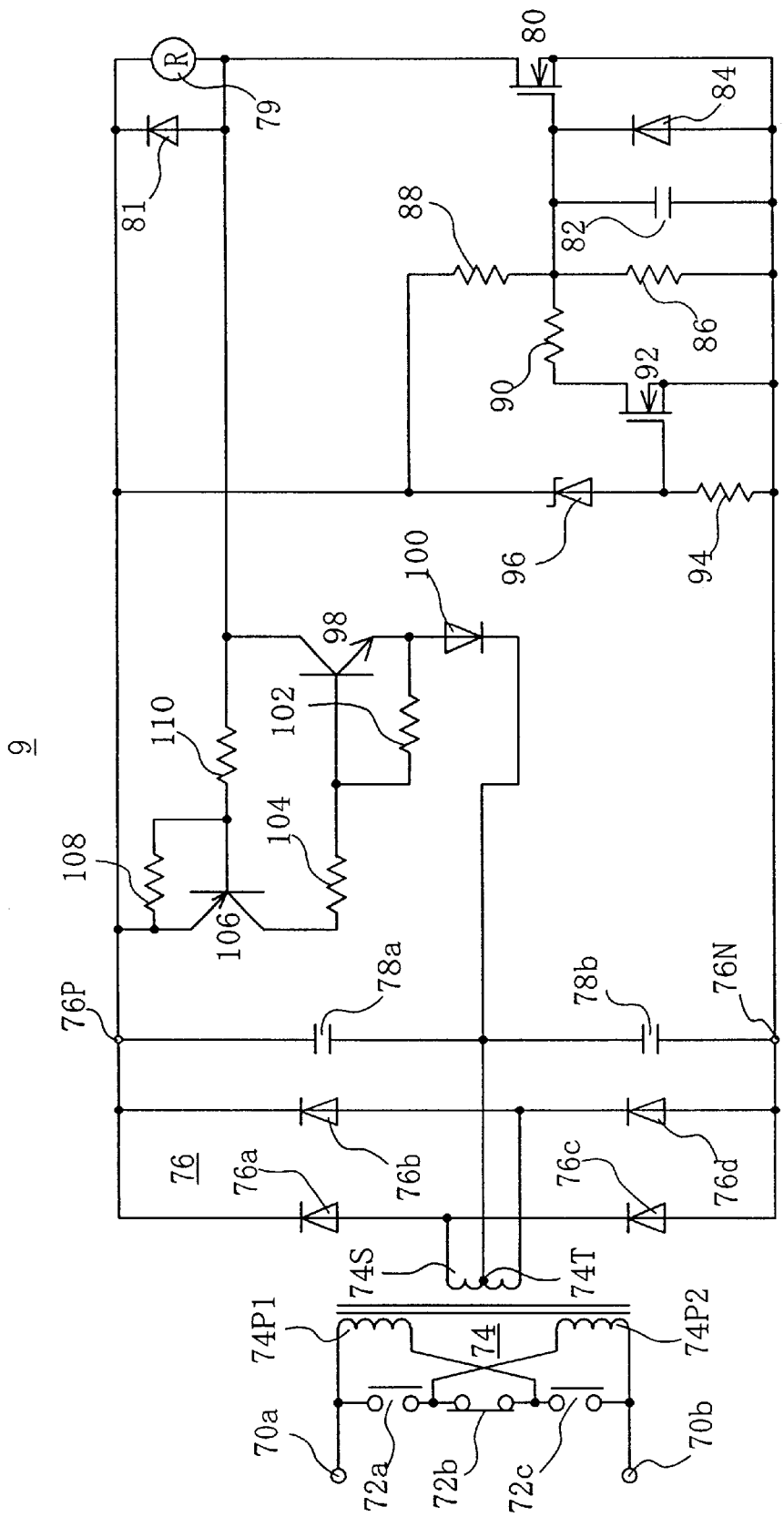
FIG. 2 is a circuit diagram illustrating a switching control unit of the power supply apparatus shown in FIG. 1.

As shown in FIG. 2, the switching control unit 9 has two input terminals 70a and 70b which are connected respectively to the input terminals 2a and 2b of the power supply apparatus Between the input terminals 70a and 70b, a normally open switch 72a, a normally closed switch 72b and a normally open switch 72c are connected in series in the name order with the switch 72a connected to the input terminal 70a. The input terminal 70a is connected to a first terminal of a primary winding 74P1 of a transformer 74, which has a second primary winding too. The other, second end of the first primary winding 74P1 is connected to the junction of the normally closed switch 72b and the normally open switch 72c. The second primary winding 74P2 has its first end connected to the junction of the normally open switch 72a and the normally closed switch 72b, and has its second end connected to the input terminal 70b.

Accordingly, when the normally open switches 72a and 72c are open and the normally closed switch 72b is closed, as shown in FIG. 2, the first and second primary windings 74P1 and 74P2 are connected in series between the input terminals 70a and 70b. On the other hand, when the switches 72a and 72c are closed and the switch 72b is open, the primary windings 74P1 and 74P2 are connected in parallel.

The transformer 74 also has a secondary winding 74S, across which a rectifier circuit 76. The rectifier circuit 76 includes diodes 76a, 76b, 76c and 76d connected to form a bridge. Smoothing capacitors 78a and 78b are connected in series between output terminals 76P and 76N of the rectifier circuit 76, with the capacitor 78a connected to the output terminal 76P. The junction of the smoothing capacitors 78a and 78b is connected to a tap 74T on the secondary winding 74S.

Between the output terminals 76P and 76N of the rectifier circuit 76, connected is a series combination of a relay drive coil 79 and a conduction path of a semiconductor switching device, e.g. the drain-source conduction path of a FET 80. A protection diode 81 is connected in parallel with the relay drive coil 79. When current flows through the relay drive coil 79, the normally open switches 72a and 72c are closed, the normally closed switch 72b is opened, the normally open switches 8a and 8b of the switching arrangement 8 shown in FIG. 1 are closed, and the normally closed switch 8c is opened. When no current is flowing through the relay drive coil 79, the normally open switch 72a and 72c and the normally closed switch 72b shown in FIG. 2 are respectively opened and closed, and the normally open switches 8a and 8b and the normally closed switch 8c of FIG. 1 are opened and closed, respectively.

A parallel combination of a capacitor 82, a protection diode 84 and a resistor 86 is connected between the gate and drain of the FET 80, with the junction of the resistor 86 and the gate connected through a resistor 88 to the output terminal 76P of the rectifier 76. The junction of the resistors 88 and 86 is connected to the drain of another FET 92 through a resistor 90. The source of the FET 92 is connected to the output terminal 76N of the rectifier 76. A resistor 94 is connected between the gate of the FET 92 and the output terminal 76N. A zener diode 96 has its anode connected to the gate of the FET 92 and has its cathode connected to the output terminal 76P.

The junction of the relay drive coil 79 and the drain of the FET 80 is connected to a semiconductor switching device, e.g. to the collector of an NPN transistor 98 of which the emitter is connected to the tap 74T of the secondary winding 74S of the transformer 74 through a diode 100. A resistor 102 is connected between the base and emitter of the transistor 98. The base of the transistor 98 is also connected through a resistor 104 to a semiconductor switching device, e.g. to the collector of a PNP transistor 106, the emitter of which is connected to the output terminal 76P. A resistor 108 is connected between the base and emitter of the transistor 106. The base of the transistor 106 is also connected through a resistor 110 to the collector of transistor 98.

Now, the operation of the power supply apparatus is described.

Let it be assumed that when no commercial AC power supply is connected to the input terminals 2a, 2b and 2c, the switches 8a, 8b and 8c are in the state as shown in FIG. 1, in which the normally open switches 8a and 8b are open and the normally closed switch 8c is closed, and the switches 72a, 72b and 72c are in the state as shown in FIG. 2, in which the normally open switches 72a and 72c are open and the normally closed switch 72b is closed, in this state, the smoothing capacitors 6a and 6b are connected in series, and the first and second primary windings 74P1 and 74P2 are also connected in series.

Now, let it be assumed that a commercial AC power supply providing one of the voltages in the first, higher voltage group is connected to the input terminals 2a–2c, with the switches 8a–8c and 72a–72c, the smoothing capacitors 6a and 6b and the primary windings 74P1 and 74P2 being in the above-stated states. The connection of the commercial AC power supply causes a single-phase AC voltage to be coupled between the input terminals 70a and 70b of the switching control unit 9, which causes an AG voltage to be induced in the secondary winding 74S. The induced AC voltage is rectified in the rectifier circuit 76, smoothed by the smoothing capacitors 78a and 78b, resulting in development of a DC voltage between the output terminals 76P and 76N. This DC voltage is applied across the series combination of the zener diode 96 and the resistor 94. This causes the zener diode 96 to be rendered conductive since it has such a characteristic as to be rendered conductive when a commercial AC power supply providing a voltage in the higher voltage group is connected to the power supply apparatus. This, in turn, renders the FET 92 conductive. As a result, the potential at the gate of the FET 80 approaches the value of the potential at the output terminal 76N, Therefore, the FET 80 is nonconductive, and no current flows through the relay drive coil 79. Accordingly, the switches 8a, 8b, 8c, 72a, 72b and 72c remain in the above-described initial states.

With the switches 8a, 8b, 8c, 72a, 72b and 72c in the above-described states, the commercial AC voltage applied to the input terminals 2a, 2b and 2c is rectified in the input-side rectifier 4 and, then, smoothed by the serially connected smoothing capacitors 6a and 6b. The voltages across the smoothing capacitors 6a and 6b are applied to the inverters 10a and 10b, respectively, where they are converted to high-frequency voltages. The high-frequency voltages from the inverters 10a and 10b are voltage-transformed by the transformers 17 and 22, and the transformed voltages are rectified by the rectifying diodes 26a and 26b and the rectifying diodes 30a and 30b. The rectified voltages are smoothed by the smoothing reactor 28 and applied to the load 32.

It is when the commercial AC voltage coupled to the power supply apparatus is 575 V that a highest voltage is applied across the collector-emitter path of each of the IGBTs 14a, 14b, 18a and 18b. When an AC voltage of 575 V is applied, the voltage applied across the emitter-collector conduction path of each of the IGBTs 14a, 14b, 18a and 18b is $575\,V \times \sqrt{2}/2$, which is equal to about 404 V. As previously described, the IGBTs 14a, 14b, 18a and 18b has a voltage rating or withstanding voltage of about 800 V, and, therefore, there is no fear that they are damaged. In addition, the IGBTs having a withstanding voltage of 800 V have a better switching characteristic than ones having a withstanding voltage of 1200 V.

The current output from the inverters 10a and 10b are detected respectively by the current detectors 34a and 34b, which develop current-representative signals representing the currents they detect. The current-representative signals are applied to the error amplifiers 38a and 38b, respectively, to control the inverters 10a and 10b in the manner described previously, to provide constant currents determined in accordance with the reference signal provided from the reference signal generator 36 to the error amplifiers 38a and 38b.

Since the inverters 10a and 10b are connected in series, the contributions of the current provided by the inverter 10a and the current provided by the other inverter 10b relative to the current supplied to the load 32 may be unbalanced. If, for example, the current provided by the inverter 10a becomes larger than the current provided by the inverter 10b, the input voltage to the inverter 10b, i.e. the voltage across the smoothing capacitor 6b becomes larger than the input voltage to the inverter 10a, i.e. the voltage across the smoothing capacitor 6a. This causes the light-emitting diode 48a to emit light, which, in turn, renders the phototransistor 46a conductive. As a result, the reference voltage at the voltage supply terminal 40 is voltage-divided by the resistors 42a and 44a, and the voltage resulting from the voltage-dividing is applied to the error amplifier 38a. In other words, the reference signal applied to the error amplifier 38a becomes smaller than before. Then the inverter control unit 15 operates to control the conduction periods of the IGBTs 14a and 14b in such a manner as to reduce the current provided by the inverter 10a, to thereby balance the currents provided by the inverters 10a and 10b.

On the other hand, if the contribution of the inverter 10b to the current to be supplied to the load 32 is larger than that of the inverter 10b, the light-emitting diode 48b emits light, rendering the phototransistor 46b conductive, which, in turn, lessens the reference signal to be supplied to the error amplifier 38b. Then, the current provided by the inverter 10b is reduced.

If the voltage applied to the input terminals 2a, 2b and 2c is one of the voltages of the lower voltage group, the zener diode 96 cannot be rendered conductive by the DC voltage developed between the output terminals 76P and 76N of the rectifier 76 of FIG. 2. Accordingly, the FET 92 is nonconductive. The voltage applied between the gate and source of the FET 80 via the resistors 88 and 86 renders the FET 80 conductive, and current flows through the relay drive coil 79. As a result, the normally open switches 72a and 72c are closed, and the normally closed switch 72b is opened. Accordingly, the first and second primary windings 74P1 and 74P2 of the transformer 74 are connected in parallel between the input terminals 70a and 70b. At the same time, the normally open switches 8a and 8b in FIG. 1 are closed and the normally closed switch 8c is opened, which results in the parallel connection of the smoothing capacitors 6a and 6b between the output terminals 4P and 4N of the input-side rectifier 4.

The conduction of the FET 80 causes the transistors 106 and 98 to become conductive. Then, current is supplied to the relay drive coil 79 also through the transistor 98. Therefore, even when the FET 80 is made nonconductive, current flow through the relay driver coil 79 can be held. In other words, the relay driver coil 79 is latched.

As described previously, the smoothing capacitors 6a and 6b are connected in parallel with each other. The inverters 10a and 10b connected in parallel with the respective capacitors 6a and 6b convert the DC voltages across the respective smoothing capacitors into high-frequency voltages, which are voltage-transformed by the associated transformers 17 and 22. The high-frequency voltages induced in the secondary windings of the respective transformers 17 and 22 are rectified by the diodes 26a and 26b and the diodes 30a and 30b, respectively. The rectified voltages are smoothed by the smoothing reactor 28 and applied to the load 32.

Since the normally open switch 8a is closed, the series combination 54a has its one end connected to the output terminal 4P of the input-side rectifier 4 and has its other end connected to the junction of the resistors 56a and 56b. Thus, the voltage at the one end of the series combination 54a is higher than the voltage at the other end, resulting in the emission of light from the light-emitting diode 48a. On the other hand, since the normally open switch 8b is closed, one end of the series combination 54b is connected to the output terminal 4N, while the other end is connected to the junction of the resistors 56a and 56b. Accordingly, the voltage at the one end of the series combination 54b is lower than the voltage at the other end. This causes the light-emitting diode 48b to emit light. In other words, when the smoothing capacitors 6a and 6b are connected in parallel, both light-emitting diodes 48a and 48b emit light, and, therefore, both phototransistors 46a and 46b are rendered conductive. As a result the reference signals applied to the error amplifiers 38a and 38b are both lessened. Thus, the current provided by each of the inverters 10a and 10b is smaller than the current provided when the capacitors 6a and 6b are connected in series.

Instead of a three-phase commercial AC power supply, a single-phase commercial AC power supply may be used. Also, in place of the half-bridge inverters, full-bridge inverters with IGBTs substituted for the capacitors 12a, 12b, 16a and 10b may be used. Further, in place of the IGBTs, bipolar transistors or FETs may be used. Also, a forward acting converter using two transistors may-be used as a DC-to-high-frequency converter.

What is claimed is:

1. A power supply apparatus for an arc-utilizing apparatus, comprising:
   an input terminal adapted for connection to one of commercial AC power supplies in first and second groups of commercial AC power supplies, a largest effective voltage value of voltages provided by the AC power supplies in said first group being 575 V, and a largest effective voltage value of voltages provided by the AC power supplies in said second group being smaller than a smallest effective voltage value of the voltages provided by the AC power supplies in said first group;

an input-side rectifier having two output terminals, said input-side rectifier rectifying a commercial AC voltage supplied from the commercial AC power supply connected to said input terminal and developing a rectified voltage between said output terminals;

a pair of capacitors for smoothing the rectified voltage from said input-side rectifier;

a switching arrangement for selectively connecting said pair of capacitors in series and in parallel with each other between said two output terminals of said input-side rectifier;

first and second DC-to-high-frequency converters associated with respective ones of said pair of capacitors, each of said first and second DC-to-high-frequency converters including a semiconductor switching device having a conduction path, said conduction path being rendered alternately conductive and nonconductive to thereby convert a voltage across the associated capacitor into a high-frequency voltage;

a transformer for voltage-transforming the high-frequency voltages from said first and second DC-to-high-frequency converters;

a high-frequency-to-DC converter for converting the voltage-transformed high-frequency voltage from said transformer to a DC voltage and applying the DC voltage to said arc-utilizing apparatus; and a switching control unit for controlling said switching arrangement so as to connect said pair of capacitors in parallel when a commercial AC power supply providing a commercial AC voltage in said second group is connected to said input terminal, and to connect said pair of capacitors in series when a commercial AC power supply providing a commercial AC voltage in said first group is connected to said input terminal;

said conduction path of each of said semiconductor switching devices of said first and second DC-to-high-frequency converters having a withstanding voltage of about 800 V.

2. The power supply apparatus according to claim 1 wherein:

said two output terminals comprises a positive terminal and a negative terminal;

said switching arrangement comprises a first normally open switch, a normally closed switch and a second normally open switch connected in the named order from said positive terminal to said negative terminal;

said pair of capacitors comprises first and second capacitors, said first capacitor having its first end connected to said positive terminal and having its second end connected to a junction of said normally closed switch and said second normally open switch, said second capacitor having its first end connected to a junction of said first normally open switch and said normally closed switch and having its second end connected to said negative terminal;

said first DC-to-high-frequency converter is connected across said first capacitor, and said second DC-to-high-frequency converter is connected across said second capacitor; and said power supply apparatus further comprises:

two resistors having the same resistance values connected in series between said positive and negative terminals;

a first voltage detector connected between a junction of said two resistors and said second end of said first capacitor for developing a first detection signal when a voltage at said junction of said two resistor is higher than a voltage at said second end of said first capacitor;

a second voltage detector connected between a junction of said two resistors and said first end of said second capacitor for developing a second detection signal when a voltage at said junction of said two resistor is lower than a voltage at said first end of said second capacitor;

a first current detector for developing a first current-representative signal representing an output current of said first DC-to-high-frequency converter;

a second current detector for developing a second current-representative signal representing an output current of said second DC-to-high-frequency converter;

a source of reference signal;

a first converter control unit for controlling said first DC-to-high-frequency converter in accordance with a difference between said first current-representative signal and said reference signal;

a second converter control unit for controlling said second DC-to-high-frequency converter in accordance with a difference between said second current-representative signal and said reference signal;

a first reference signal control unit disposed between said source of reference signal and said first converter control unit for reducing the value of said reference signal to be supplied to said first converter control unit when said second detection signal is developed; and a second reference signal control unit disposed between said source of reference signal and said second converter control unit for reducing the value of said reference signal to be supplied to said second converter control unit when said first detection signal is developed.

* * * * *